US008185557B2

(12) United States Patent
    Slinker

(10) Patent No.: US 8,185,557 B2
(45) Date of Patent: May 22, 2012

(54) POSITIONING OF NON-CONSTRAINED AMOUNT OF DATA IN SEMBLANCE OF A TREE

(75) Inventor: Geoffrey Scott Slinker, Provo, UT (US)

(73) Assignee: Ancestry.com Operations Inc., Provo, UT (US)

( * ) Notice: Subject to any disclaimer, the term of this patent is extended or adjusted under 35 U.S.C. 154(b) by 288 days.

(21) Appl. No.: 12/695,056

(22) Filed: Jan. 27, 2010

(65) Prior Publication Data

US 2011/0184992 A1    Jul. 28, 2011

(51) Int. Cl.
    *G06F 7/00*     (2006.01)
    *G06F 17/30*    (2006.01)
(52) U.S. Cl. ........................................ 707/797; 707/798
(58) Field of Classification Search .................. 707/797, 707/798; 434/154
    See application file for complete search history.

(56) References Cited

U.S. PATENT DOCUMENTS

| 4,501,559 A * | 2/1985 | Griswold et al. ............. 434/154 |
| 6,978,271 B1 * | 12/2005 | Hoffman et al. ........................ 1/1 |
| 7,194,483 B1 * | 3/2007 | Mohan et al. .................. 707/600 |
| 8,095,567 B2 * | 1/2012 | Cookson et al. .............. 707/797 |
| 2005/0010371 A1 * | 1/2005 | Merriam-Leith ............... 702/20 |
| 2005/0147947 A1 * | 7/2005 | Cookson et al. .............. 434/154 |
| 2008/0108027 A1 * | 5/2008 | Sallin ........................... 434/154 |

* cited by examiner

*Primary Examiner* — Ann Chempakaseril
(74) *Attorney, Agent, or Firm* — Kilpatrick Townsend & Stockton LLP

(57) ABSTRACT

Methods, devices and systems are described for implementing a method for positioning a non-constrained amount of data in semblance of a tree. The method includes receiving genealogical data including nodes and generating a directed graph of the nodes of the genealogical data. The directed graph is to maintain parent-child relationships among the nodes and to maintain generations. The genealogical data includes a root node. The method includes moving the nodes along the horizontal axis such that each node is in an equal spacing with respect to each node's parent node, determining a number of generations in the genealogical chart, and generating a number of quadratic curves equal to the number of generations. The apex of the quadratic curves is the position of the tree's trunk. The method includes dropping the nodes in the Y-axis along the curve of the quadratic curves. Each generation is in line with the quadratic curve.

20 Claims, 12 Drawing Sheets

FIG. 2A

| Person | Dates |
|---|---|
| Joseph Scott Simmerman | 1884 - 1985 |
| Theresa Rose Waldorf | 1890 - 1928 |
| Robert Jake Franklin | 1895 - 1974 |
| Susan Eliza Hope Porterman | 1896 - 1973 |
| William Robert Clancey Wilkerson | |
| Jillian Bonnet Frazier | |
| Wilford Manly Chumley | |
| Louise Sophilia Roberts | |
| Waldorf Jacob Simmerman | 1915 - 1993 |
| Martha Susanna Hope Franklin | 1913 - 2002 |
| Frances James Wilkerson | 1903 - 1941 |
| Mary Sarah Louise Chumley | 1913 - |
| Jonathan Franklin Waldorf Simmerman | 1940 - |
| Elizabeth Mary Frances Wilkerson | 1941 - |
| Horatio Jonathan Franklin Simmerman | 1960 - |

POSITIONING OF NON-CONSTRAINED AMOUNT OF DATA IN SEMBLANCE OF A TREE

BACKGROUND OF THE INVENTION

Previously, methods of tree layout have accomplished using a form with fixed locations superimposed upon a facsimile (or crude representation) of a tree, and then overlay a discrete number of rectangular areas in which data is positioned. The facsimile is static such that it does not allow for dynamically adding and removing of nodes and repositioning to maintain the tree structure. Furthermore, a user must manually drag and place the members of the pedigree chart in a fashion that would resemble the shape of a tree. On such example may be found in FIG. 1, which illustrates a typical tree chart or form. The following invention serves to remedy these and other problems.

BRIEF SUMMARY OF THE INVENTION

Devices, systems, and methods are described for a novel positioning of a non-constrained amount of data in semblance of a tree.

In some embodiments, a method of implementing a method for positioning a non-constrained amount of data in semblance of a tree. The method includes receiving, at a computing system, genealogical data including a plurality of nodes and generating a directed graph of the plurality of nodes of the genealogical data. The directed graph is configured to maintain parent-child relationships among the plurality of nodes and to maintain at least one generation. The genealogical data includes a root node. The method further includes displaying, on a display screen in communication with the computing system, the plurality of nodes in a left-justification configuration. The plurality of nodes are positioned with respect to the relationships of the directed graph.

Furthermore, the method includes moving the plurality of nodes along the horizontal axis such that each node is in an equal spacing with respect to each node's parent node, determining a number of generations in the genealogical chart, and generating a number of quadratic curves equal to the number of generations. The apex of the quadratic curves is the position of the tree's trunk. The method further includes dropping the plurality of nodes in the Y-axis along the curve of the quadratic curves. Each generation is configured to be in line with the respective quadratic curve. Then, the method includes dropping down the root node at the apex of the quadratic curves to form the trunk of the tree.

In yet another embodiment, a computer-readable storage medium having a computer-readable program embodied therein for implementing a method for positioning a non-constrained amount of data in semblance of a tree. The computer-readable storage medium includes instructions for receiving, at a computing system, genealogical data including a plurality of nodes and generating a directed graph of the plurality of nodes of the genealogical data. The directed graph is configured to maintain parent-child relationships among the plurality of nodes and to maintain at least one generation. The genealogical data includes a root node. The computer-readable storage medium further includes instructions for displaying, on a display screen in communication with the computing system, the plurality of nodes in a left justification configuration. The plurality of nodes are positioned with respect to the relationships of the directed graph.

Furthermore, the computer-readable storage medium includes instructions for moving the plurality of nodes along the horizontal axis such that each node is in an equal spacing with respect to each node's parent node, determining a number of generations in the genealogical chart, and generating a number of quadratic curves equal to the number of generations. The apex of the quadratic curves is the position of the tree's trunk. The computer-readable storage medium further includes instructions for dropping the plurality of nodes in the Y-axis along the curve of the quadratic curves. Each generation is configured to be in line with the respective quadratic curve. Then, the computer-readable storage medium includes instructions for dropping down the root node at the apex of the quadratic curves to form the trunk of the tree.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components.

FIGS. 2A-2C are node organizations for positioning a non-constrained amount of data in a semblance of a tree, in accordance with aspects of the present invention.

DETAILED DESCRIPTION OF THE INVENTION

Figure 1:
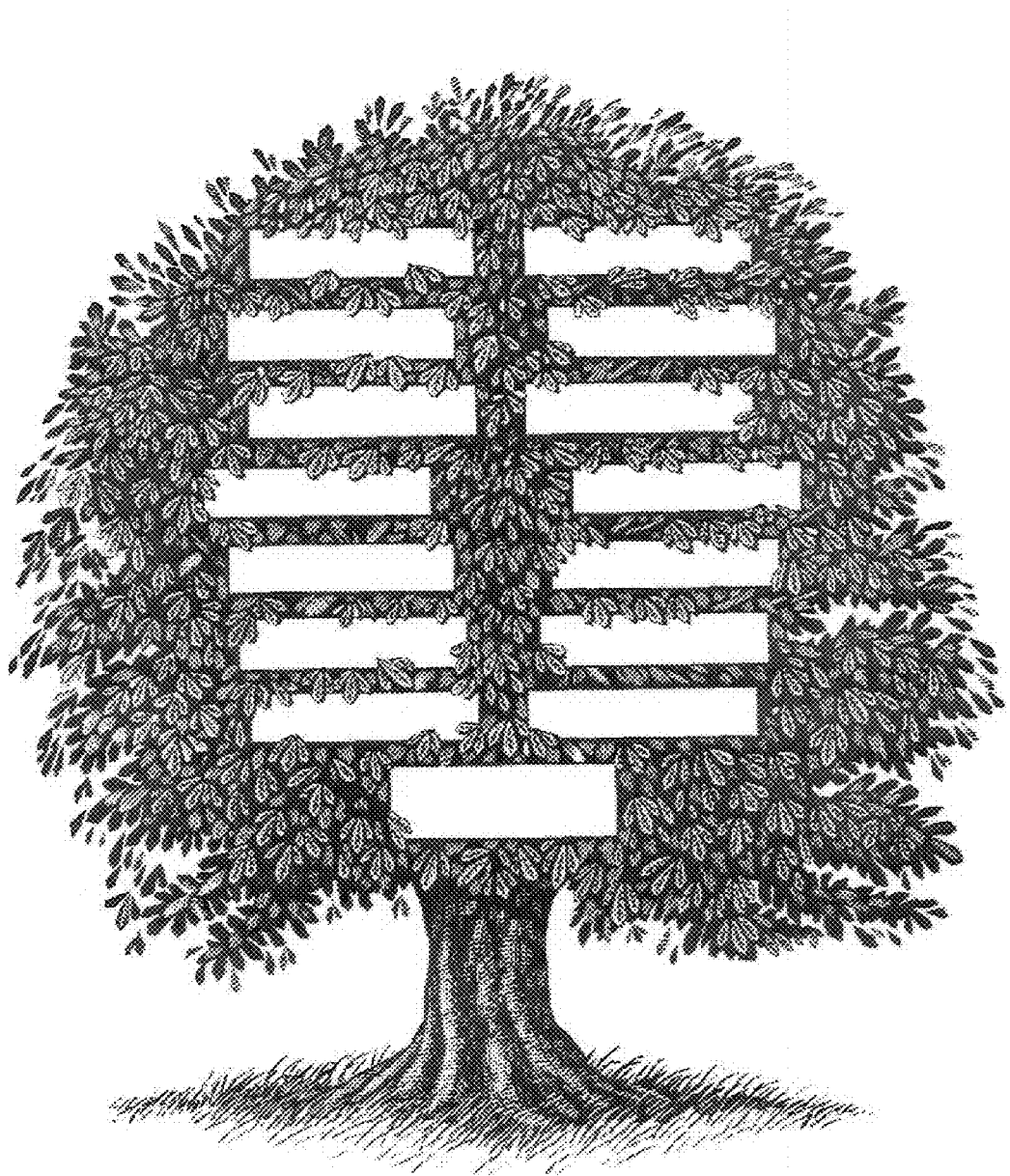
FIG. 1 is a typical tree chart or form.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provide solutions (including without limitation, devices, systems, methods, software programs, and the like) for implementing a method for positioning a non-constrained amount of data in semblance of a tree. Aspects of the present invention related to the placement of the nodes of a tree algorithmically without any user interaction. Further, aspects of the invention avoids overlap or collisions of a tree's nodes, and correctly spaces and avoids collisions even if the items in the tree are different in size. Further, aspects of the invention correctly balances the nodes vertically in such a manner that the "father's side of the tree" is distinguishable from "the mother's side of the tree." According to further aspects of the present invention, calculation of the position information necessary to create a chart that has the semblance of an actual tree, is described.

Aspects of the present invention further includes: 1) gathering genealogical information into a data structure such as a directed graph, which allows access to the data randomly, by generation, by relationship, or by position, 2) rendering the genealogical data into displayable information bounded and sized (this data is called a display node can be positioned, scaled, rotated, and generally transformed), 3) the nodes are then organized vertically and left justified applying any spacing between the display nodes, 4) the nodes are then centered horizontally retaining the spacing of the previous procedures, and 5) The node's locations are mapped into a space that gives the semblance of a tree.

Turning now to FIG. 2A, which illustrates vertical and left justification node organization for positioning a non-constrained amount of data in a semblance of a tree, in accordance with aspects of the present invention. In this display, he nodes of a genealogical chart are organized vertically and left-justified with spacing between the display nodes being applied. The spacing may be configured by a user manually, or may be determined automatically.

Figure 2B:
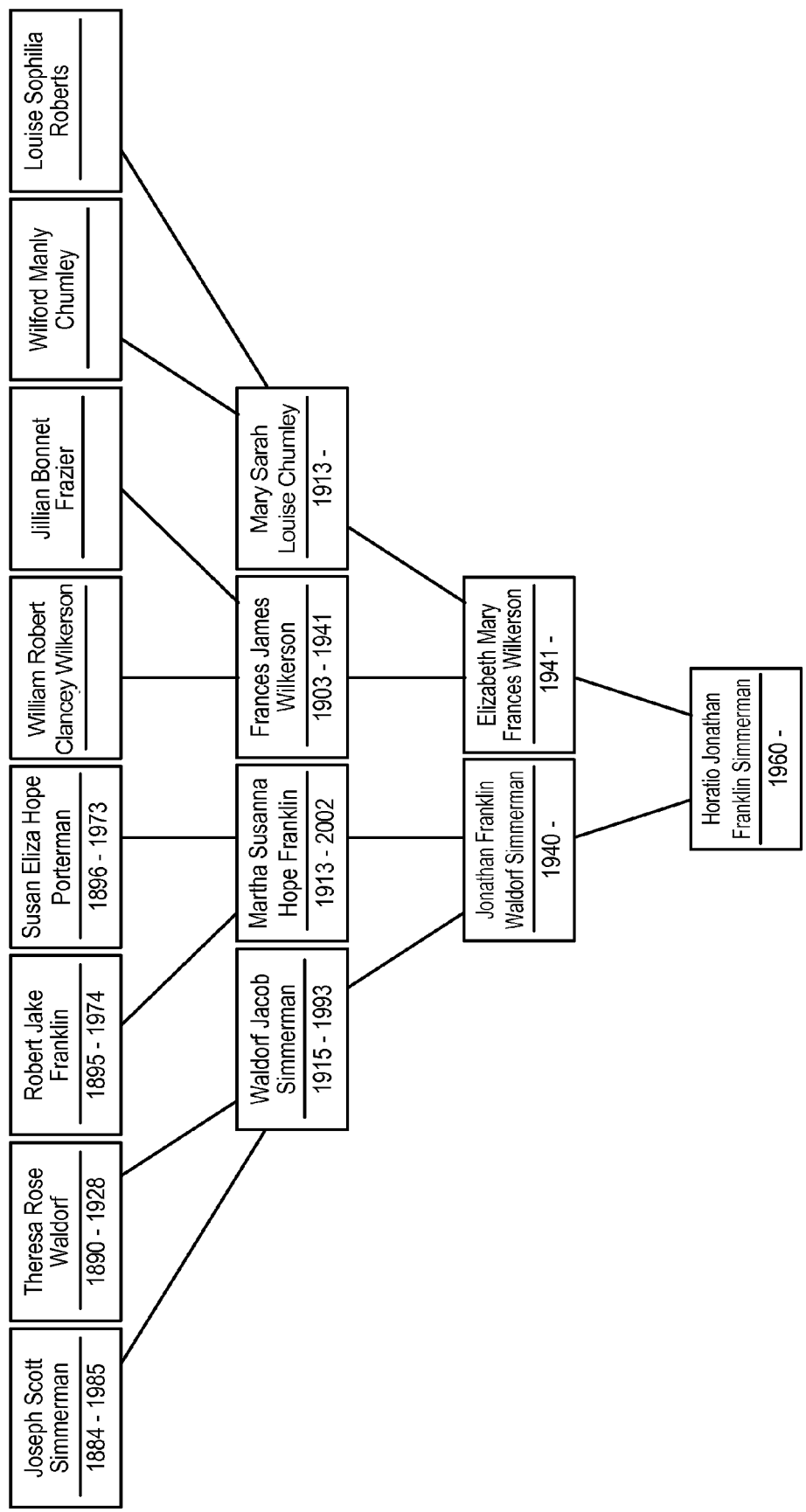

FIG. 2B further illustrates generations centered with spacing retained for positioning a non-constrained amount of data in a semblance of a tree, in accordance with aspects of the present invention. In this display, the nodes of the genealogical chart are then centered horizontally retaining the spacing of the FIG. 2A. Accordingly, the root node of the genealogical chart is centered at the base (as shown in FIG. 2B), and the parent relationships fan out from the root node.

Figure 2C:
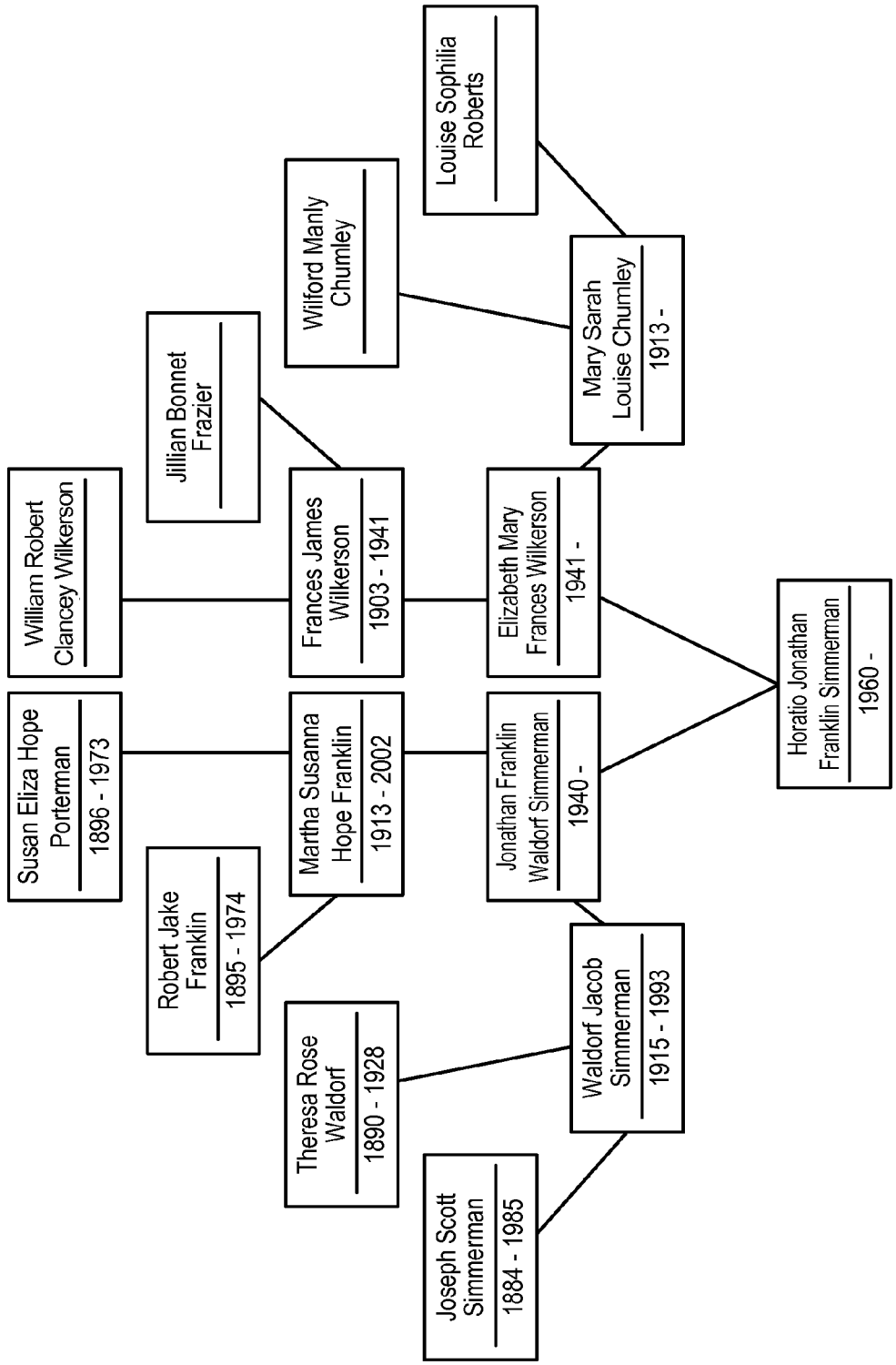

Furthermore, FIG. 2C illustrates a node organization mapped into new coordinate space for positioning a non-constrained amount of data in a semblance of a tree, in accordance with aspects of the present invention. This display shows the nodes of the genealogical chart being mapped in the semblance of a tree. The positioning of the nodes to form the tree is determined by the curve of a quadratic curve (this is described in detail below).

Figure 3A:
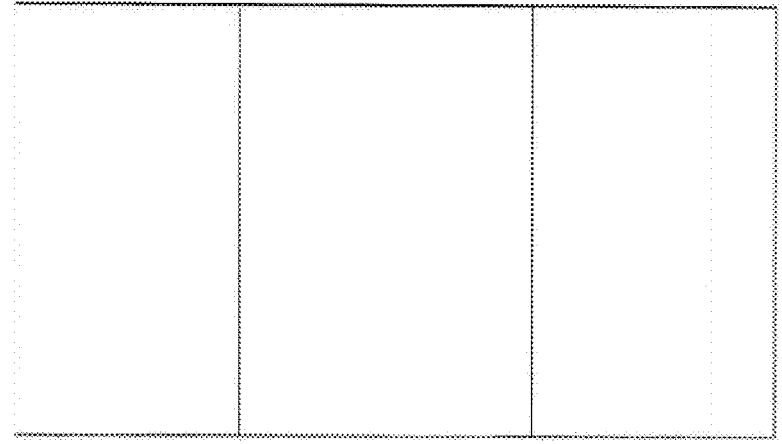
FIGS. 3A-3C are rectangles used for a parametric map of a pedigree chart, in accordance with aspects of the present invention.

Referring next to FIG. 3A, which illustrates rectangles used for a parametric map of a pedigree chart, in accordance with aspects of the present invention. Further, order to determine spacing and orientation of the nodes, mapping of a rectangular space from into a non-rectangular space occurs. FIG. 3A is a parametric map of a genealogical chart in a rectangle space. This may be defined by taking a rectangular space and dividing it horizontally by the number of generations in the chart. For example, if three generations of data is to be charted, then the rectangle is divided into three areas (as in FIG. 3A.

Figure 3B:
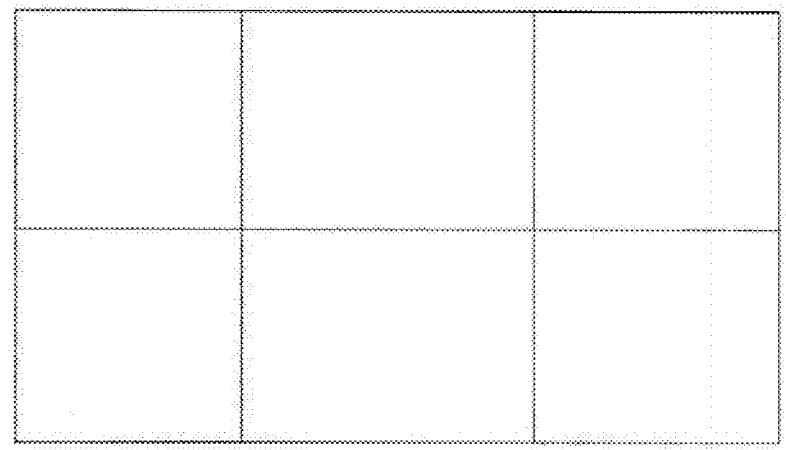
Figure 3C:
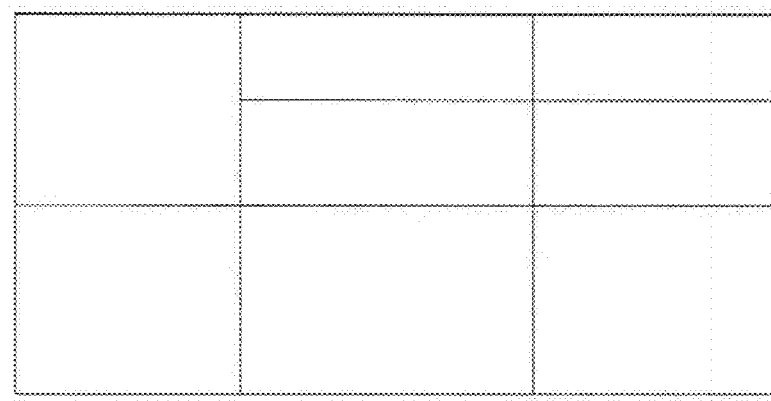

FIG. 3B illustrates a subdivision of the rectangles of FIG. 3A. The rectangle is then divided in half from the left edge to the right of the space, as in FIG. 3B. FIG. 3C illustrates a further subdivision of the rectangles of FIG. 3B. The second column is divided again from the left edge of the second column to the far right, as in FIG. 3C. This division continues until the space is divided as in FIG. 4A.

Figure 4A:
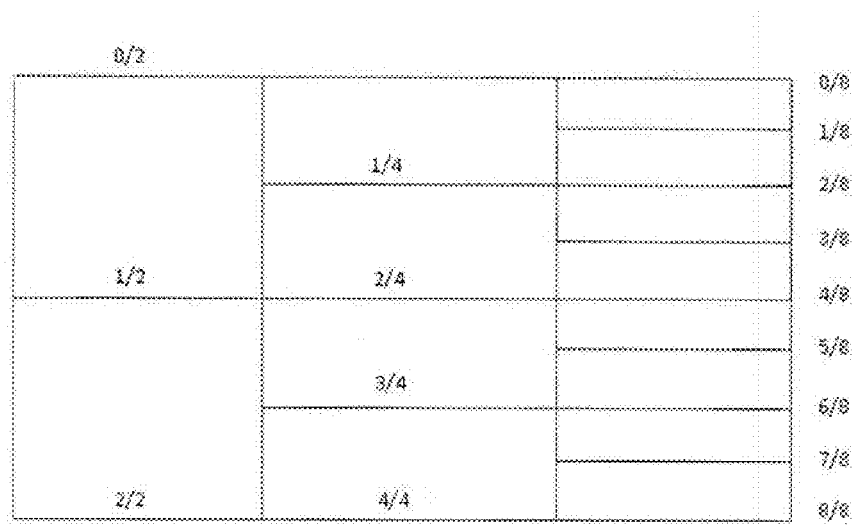
FIGS. 4A-4C are subdivided rectangular areas which give a parametric map of the space for mapping nodes into the space for a pedigree chart, in accordance with aspects of the present invention.
Figure 4B:
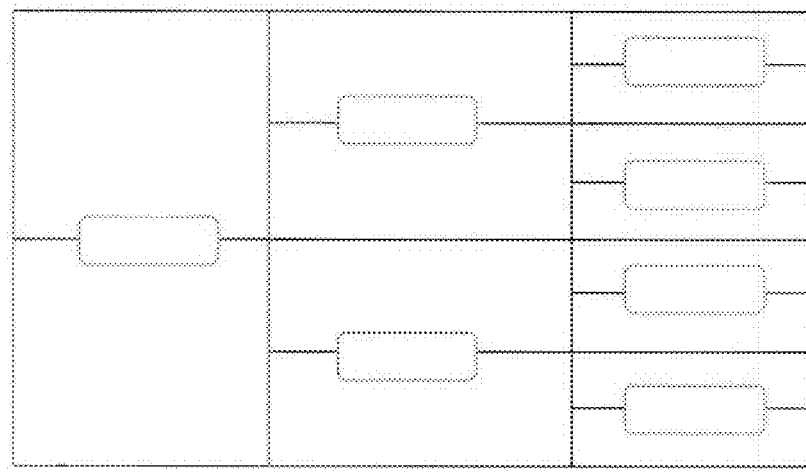
Figure 4C:
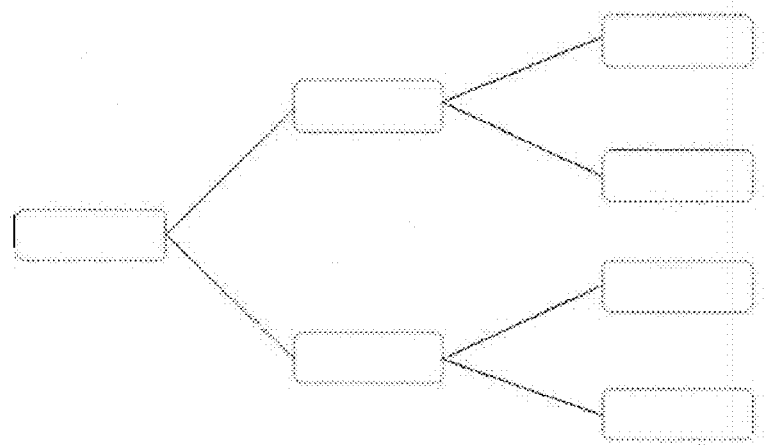

FIGS. 4A-4C are subdivided rectangular areas which give a parametric map of the space for mapping nodes into the space for a pedigree chart, in accordance with aspects of the present invention. This subdivided rectangular area gives a parametric map of the space such that it can map nodes into the space that will result in a genealogical chart. Once the rectangular area is removed FIG. 4C shows a layout for a genealogical chart. The last generation of data in a genealogical chart of three generations is positioned at $1/2^3$ (or 1/8), 3/8, 5/8, and 7/8. The second generation is positioned at $1/2^2$ or (1/4) and 3/4. The first generation is placed at $1/2^1$ (or 1/2). These values may be used by the present invention to map the locations onto a non-rectangular space.

In a further embodiment, the non-rectangular space is a 2nd degree or higher curve that can be used represented in parametric form. For example, a sine wave, an inverted parabola, and a quadratic Bezier curve, etc. may be used.

Figure 5A:
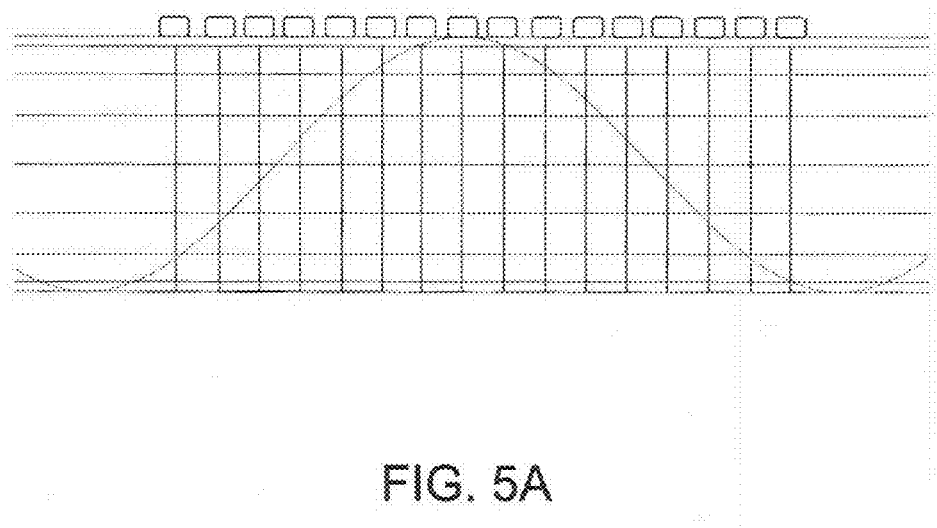
FIGS. 5A and 5B are mappings of nodes of a pedigree chart on a sine wave, in accordance with aspects of the present invention.

Turning next to FIG. 5A, which illustrates mappings of nodes of a pedigree chart on a sine wave, in accordance with aspects of the present invention. In FIG. 5A a sine wave with the horizontal axis indicating a uniform division of the period of the sine wave, is shown. Above the sine wave are rounded rectangles representing nodes of data that have been previously positioned in a rectangular space as shown in FIG. 2C. Each node is mapped onto the curve.

Figure 5B:
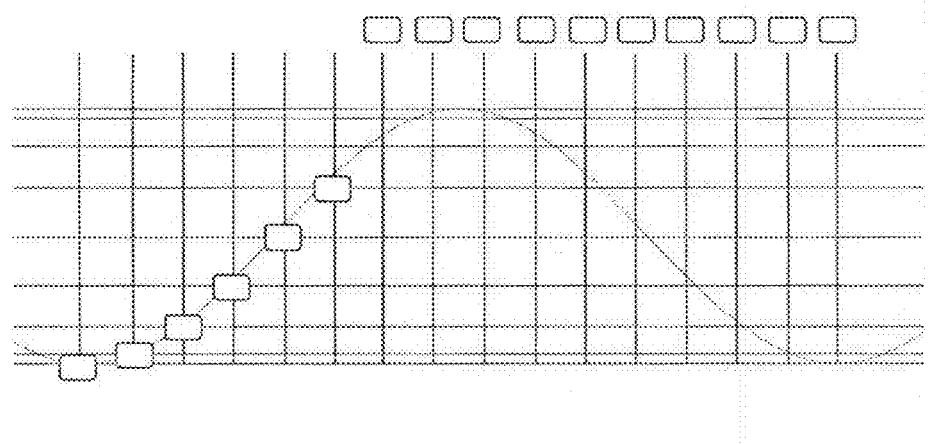
Figure 6A:
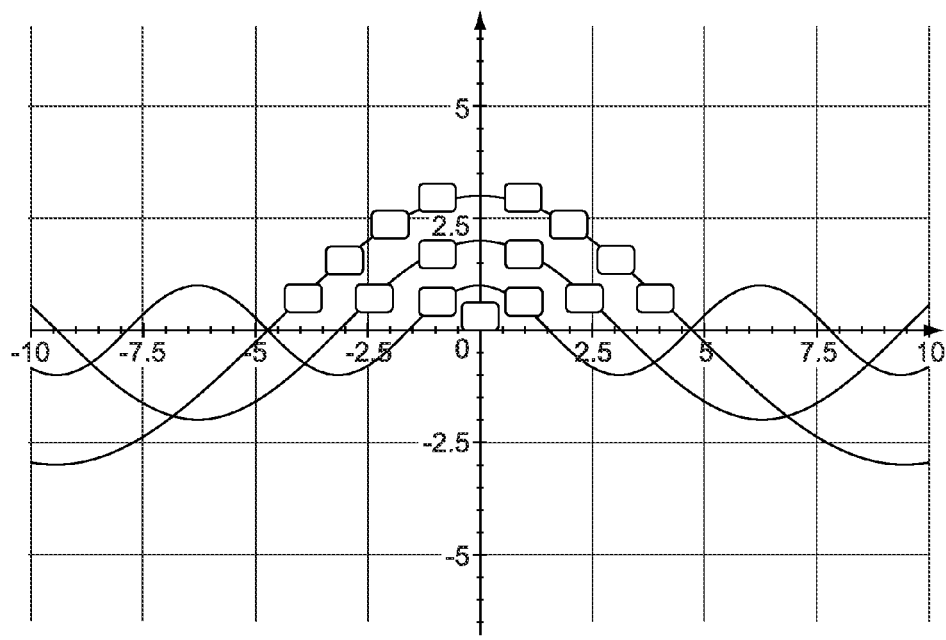
FIGS. 6A and 6B are three generations and trunk construction of a pedigree chart tree, in accordance with aspects of the present invention.
Figure 6B:
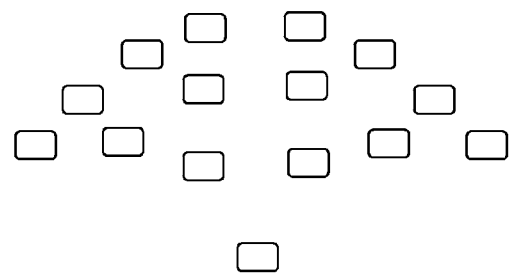
Figure 7:
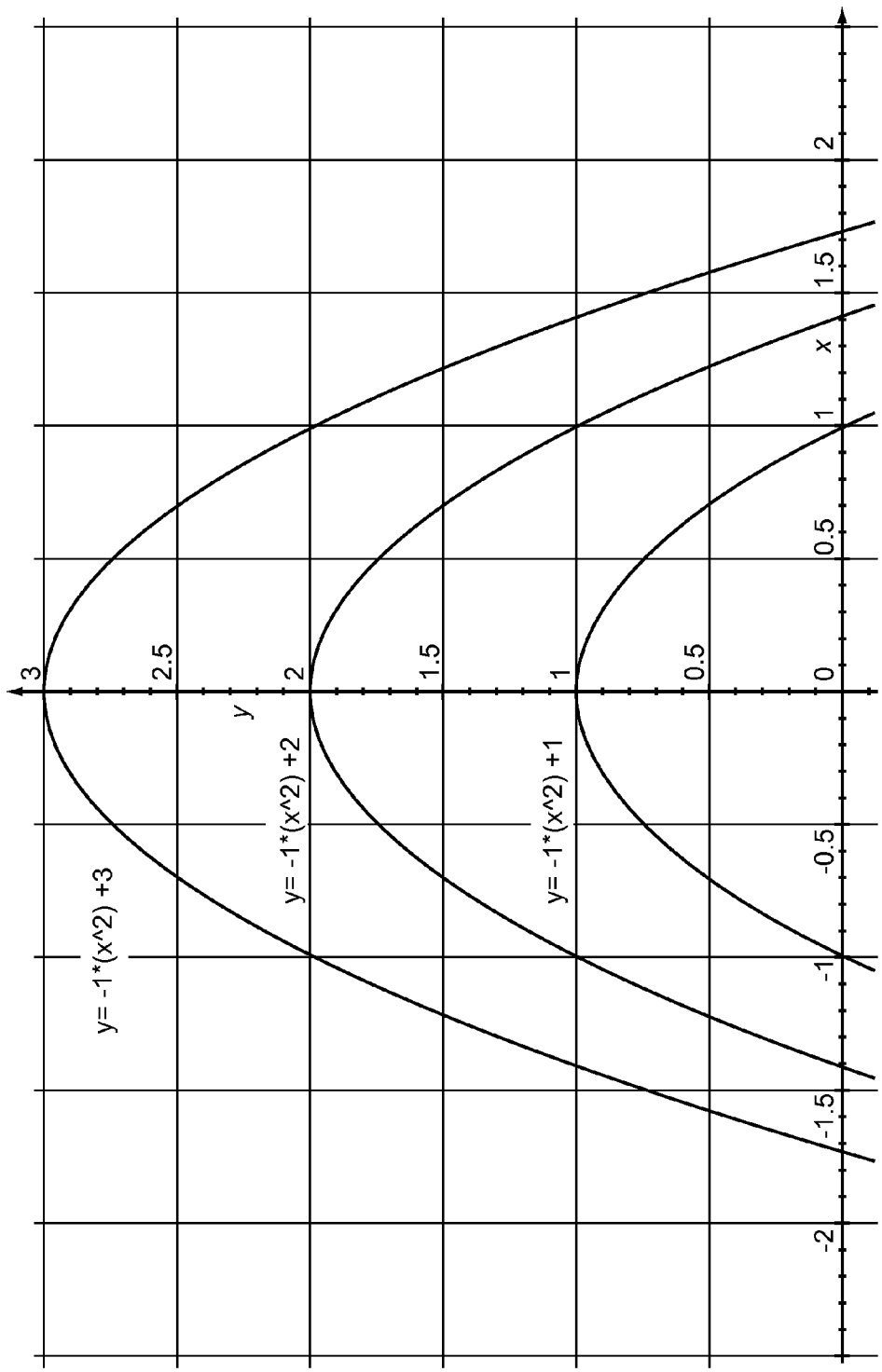
FIG. 7 is multiple parabolas for mapping generations on a pedigree chart on a parabola wave, in accordance with aspects of the present invention.

FIG. 5B illustrates mappings of generations onto a sine wave, in accordance with aspects of the present invention. The nodes are then dropped down into the curve, as shown in FIG. 5B. Referring now to FIG. 6A, which illustrates three generations of a genealogical chart mapped onto a sine wave. Each generation is mapped to a wave, and more waves are added or waves are removed dependent upon the number of generations in the chart. The trunk of the tree is created based on a ratio of the height of the tree. This calculation is a percentage of the total height of the tree. The ratio can be changed to give varied trunk sizes. As such, FIG. 6B illustrates trunk generation of a pedigree chart tree, in accordance with aspects of the present invention. Furthermore, FIG. 7 illustrates multiple parabolas for mapping generations on a pedigree chart on a sine wave, in accordance with aspects of the present invention. In this example, four generations are included in the chart. In one embodiment, the height of the tree is the vertex of the inverted parabola on the Y-axis, and the solution of the inverted parabola is the width of the tree.

Figure 8:
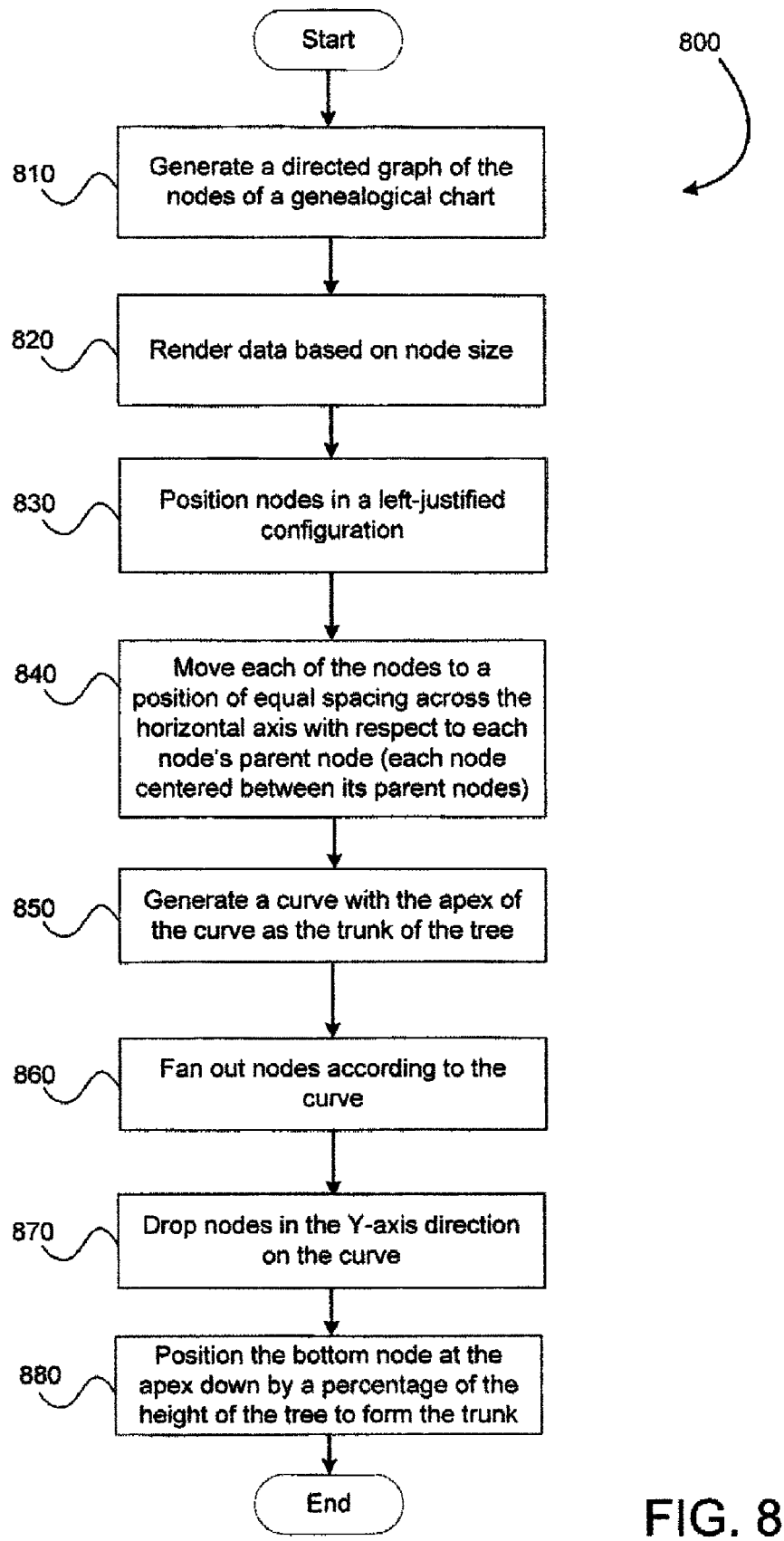
FIG. 8 is a simplified flow diagram of an embodiment of a method for implementing a method for positioning a non-constrained amount of data in semblance of a tree, in accordance with embodiments of the present invention.

FIG. 8 is a simplified flow diagram of an embodiment of a method 100 for implementing a method for positioning a non-constrained amount of data in semblance of a tree. At block 810, a directed graph of nodes from a genealogical chart may be generated. The directed graph may include a root node, parent-child relationships, sibling relationships, etc. In one embodiment, the directed graph is a binary directed graph.

At process block 820, depending on the number of nodes, the viewing space, spacing constraints, etc. a node size for each node of the genealogical chart is determined. Accordingly, the nodes may be rendered according to the determined node size. In one embodiment, the nodes may be displayed in a display device within a genealogical management program user interface.

Further, at process block 830, the rendered nodes may be aligned in a left-justified orientation (see FIG. 2A). Furthermore, the nodes may be rendered row by row, where each higher row represented a parent of the row directly below. At process block 840, each node may be moved to a position of equal spacing across the horizontal axis with respect to each node's "parent node. In other words, each node is centered below its "father" and "mother" nodes, from the root node on up to the highest nodes in the genealogical chart (see FIG. 2B).

At process block 850, a curve may be generated such that the apex of the curve represented the "trunk" of the tree (see FIG. 5A). In one embodiment, the curve may be a 2nd degree or higher curve. For example, a sine wave, an inverted parabola, and a quadratic Bezier curve, etc. may be used. At process block 860, the nodes may be fanned out according to the curve (see FIGS. 5B and 6A).

Furthermore, at process block 870, the nodes may be dropped down in the Y-axis direction on the curve, such that the nodes are aligned with the curve of the wave (see FIGS. 5B and 6A). Connection points between the nodes representing the parent-child relationships may be provided. At process block 880, the root (or bottom) node at the apex of the curve may be moved downward to form the "trunk" of the tree. In one embodiment, the root node may be moved down by a percentage of the total height of the tree. Accordingly, the resulting genealogical chart is displayed in the semblance of an actual tree (see FIG. 2C).

Figure 9:
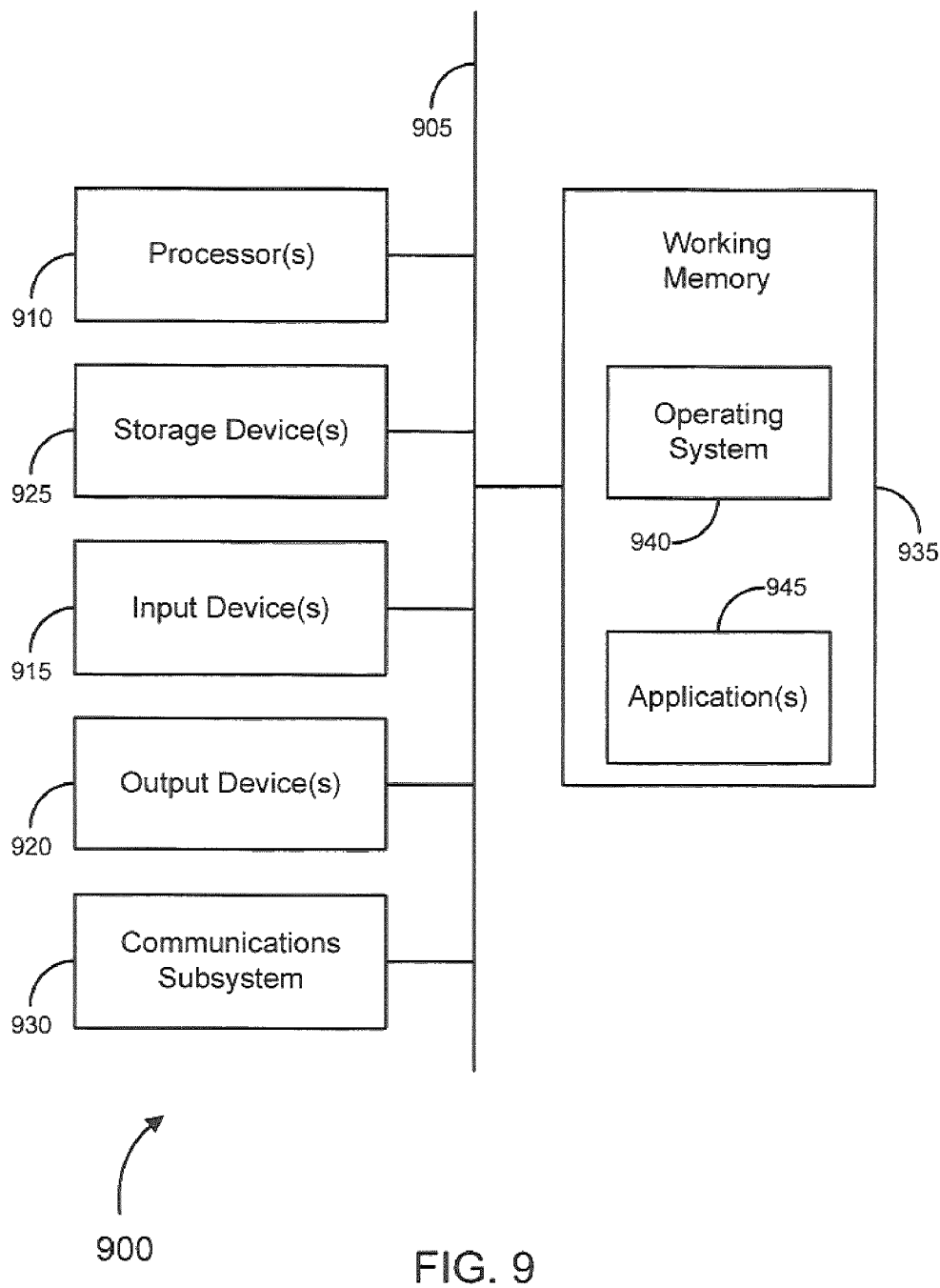
FIG. 9 is a generalized schematic diagram illustrating a computer system for implementing aspects of the present invention.

FIG. 9 provides a schematic illustration of one embodiment of a computer system 900 that can perform the methods of the invention, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements can include one or more processors 910, including without limitation, one or more general purpose processors and/or one or more special purpose processors (such as digital signal processing chips, graphics acceleration chips, and/or the like); one or more input devices 915, which can include without limitation a mouse, a keyboard and/or the like; and one or more output devices 920, which can include without limitation a display device, a printer, multi-touch (e.g., Apple™ iPhone, Microsoft™ Surface™, etc.) and the like.

The computer system 900 may further include (and/or be in communication with) one or more storage devices 925, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 900 might also include a communications subsystem 930, which can include without limitation a modem, a network card (wireless or wired), an infrared communication device, a wireless communication device and/or chipset (such as a Bluetooth™ device, an 902.11 device, a WiFi device, a WiMax device, cellular communication facilities, etc.), and/or the like. The communications subsystem 930 may permit data to be exchanged with a network (such as the network described below, to name one example), and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940 and/or other code, such as one or more application programs 945, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 900) to perform methods of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another machine-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 900, various machine-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 925. Volatile media includes, without limitation, dynamic memory, such as the working memory 935. Transmission media includes coaxial cables, copper wire and fiber optics, including the wires that comprise the bus 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc., carried by the signals) to the working memory 935, from which the processor(s) 910 retrieves and executes the instructions. The instructions received by the working memory 935 may optionally be stored on a storage device 925 either before or after execution by the processor(s) 910.

Figure 10:
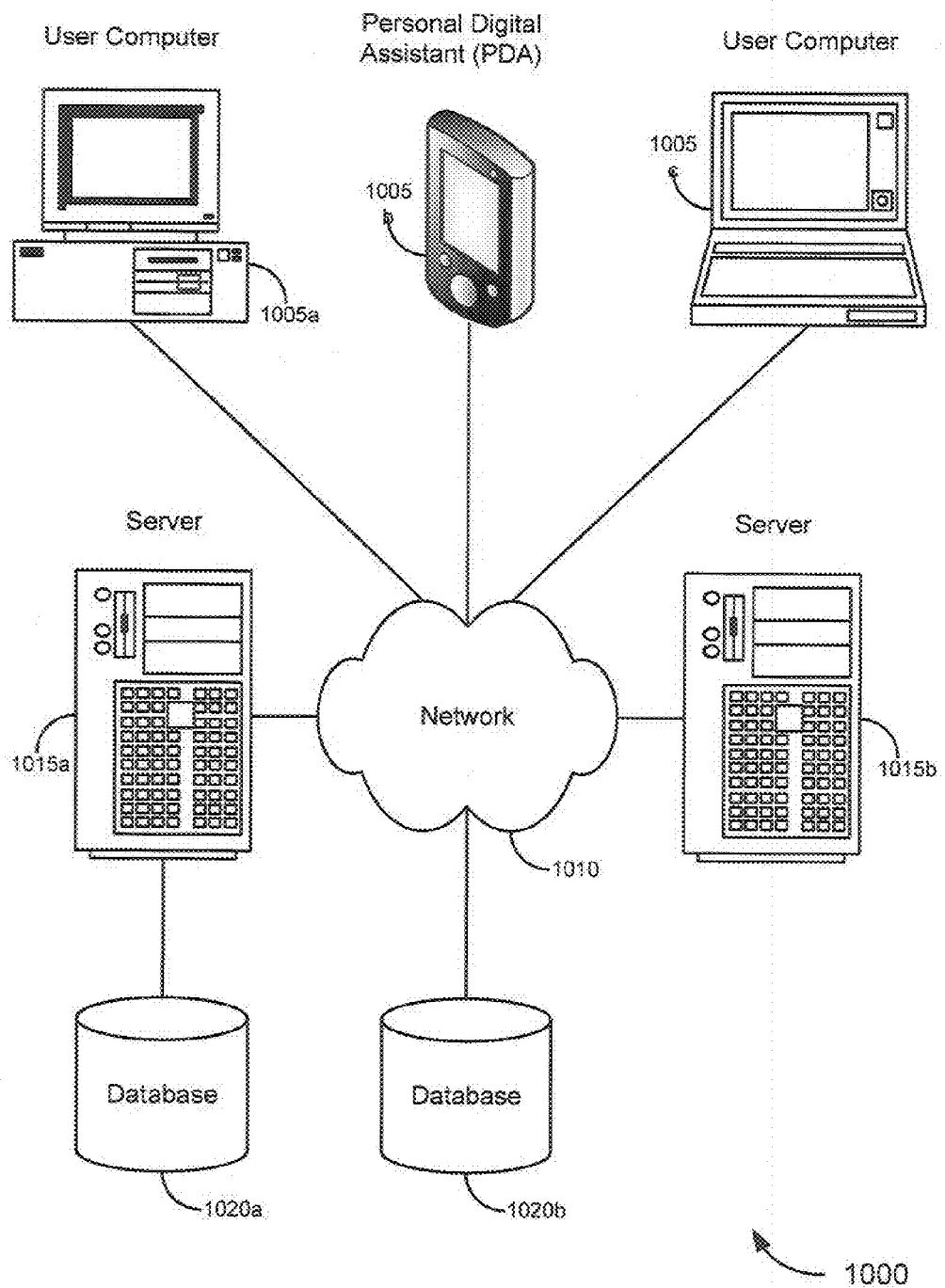
FIG. 10 is a block diagram illustrating a networked system of computers for implementing aspects of the present invention.

Merely by way of example, FIG. 10 illustrates a schematic diagram of a system 1000 that can be used in accordance with one set of embodiments. The system 1000 can include one or more user computers 1005. The user computers 1005 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 1005 can also have any of a variety of applications, including one or more applications configured to perform methods of the invention, as well as one or more office applications, database client and/or server applications, and web browser applications. Alternatively, the user computers 1005 can be any other electronic device, such as a thin-client computer, Internet-enabled mobile telephone, and/or personal digital assistant (PDA), capable of communicating via a network (e.g., the network 1010 described below) and/or displaying and navigating web pages or other types of electronic documents. Although the exemplary system 1000 is shown with three user computers 1005, any number of user computers can be supported.

Certain embodiments of the invention operate in a networked environment, which can include a network 1010. The network 1010 can be any type of network familiar to those skilled in the art that can support data communications using any of a variety of commercially available protocols, including without limitation TCP/IP, SNA, IPX, AppleTalk, and the like. Merely by way of example, the network 1010 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 1002.11 suite of protocols, the Bluetooth™ protocol known in the art, and/or any other wireless protocol; and/or any combination of these and/or other networks.

Embodiments of the invention can include one or more server computers 1015. Each of the server computers 1015 may be configured with an operating system, including without limitation any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 may be a web server, which can be used, merely by way of example, to process requests for web pages or other electronic documents from user computers 1005. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can include one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 1005 and/or another server 1015. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases a web server may be integrated with an application server.

In accordance with further embodiments, one or more servers 1015 can function as a file server and/or can include one or more of the files (e.g., application code, data files, etc.) necessary to implement methods of the invention incorporated by an application running on a user computer 1005 and/or another server 1015. Alternatively, as those skilled in the art will appreciate, a file server can include all necessary files, allowing such an application to be invoked remotely by a user computer 1005 and/or server 1015. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary. Merely by way of example, a database 1020a might reside on a storage medium local to (and/or resident in) a server 1015a (and/or a user computer 1005). Alternatively, a database 1020b can be remote from any or all of the computers 1005, 1015, so long as the database can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle™ database, that is adapted to store, update, and retrieve data in response to SQL-formatted commands. The database might be controlled and/or maintained by a database server, as described above, for example.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of implementing a method for positioning a non-constrained amount of data in semblance of a tree, the method comprising:

receiving, at a computing system, genealogical data including a plurality of nodes and generating a directed graph of the plurality of nodes of the genealogical data, wherein the directed graph is configured to maintain parent-child relationships among the plurality of nodes and to maintain at least one generation, wherein the genealogical data includes a root node;

displaying, on a display screen in communication with the computing system, the plurality of nodes in a left justification configuration, wherein the plurality of nodes are positioned with respect to the relationships of the directed graph;

moving the plurality of nodes along the horizontal axis such that each node is in an equal spacing with respect to each node's parent node;

determining a number of generations in the genealogical chart;

generating a number of quadratic curves equal to the number of generations, wherein the apex of the quadratic curves is the position of the tree's trunk;

dropping the plurality of nodes in the Y-axis along the curve of the quadratic curves, wherein each generation is configured to be in line with the respective quadratic curve; and dropping down the root node at the apex of the quadratic curves to form the trunk of the tree.

2. A method of implementing a method for positioning a non-constrained amount of data in semblance of a tree as in claim 1, further comprising centering each of the plurality of nodes of one generation with each of the plurality of nodes of a subsequent generation.

3. A method of implementing a method for positioning a non-constrained amount of data in semblance of a tree as in claim 1, wherein the quadratic curve comprises a second degree or higher curve.

4. A method of implementing a method for positioning a non-constrained amount of data in semblance of a tree as in claim 1, wherein the quadratic curve comprises one or more of the following: a Bazier curve, an inverted parabola, and a sine curve.

5. A method of implementing a method for positioning a non-constrained amount of data in semblance of a tree as in claim 4, wherein the vertex of the inverted parabola comprises the trunk position.

6. A method of implementing a method for positioning a non-constrained amount of data in semblance of a tree as in claim 1, further comprising providing a user interface configured to provide a user with controls to manipulate the genealogical tree.

7. A method of implementing a method for positioning a non-constrained amount of data in semblance of a tree as in claim 6, further comprising providing user interface components for selecting an image of a tree to display as a background of the genealogical chart.

8. A method of implementing a method for positioning a non-constrained amount of data in semblance of a tree as in claim 6, further comprising providing user interface components for changing font and data of the display of the genealogical tree.

9. A method of implementing a method for positioning a non-constrained amount of data in semblance of a tree as in claim 1, wherein the number of generations determines the amplitude of the quadratic curve.

10. A method of implementing a method for positioning a non-constrained amount of data in semblance of a tree as in claim 9, wherein a selected horizontal spacing of each of the nodes determines the period of the quadratic curve.

11. A non-transitory computer readable storage medium having a computer-readable program embodied therein for directing operation of a computer system, including a processor and a storage device, wherein the computer-readable program includes instructions for operation the computers system to:
   receive genealogical data including a plurality of nodes and generating a directed graph of the plurality of nodes of the genealogical data, wherein the directed graph is configured to maintain parent-child relationships among the plurality of nodes and to maintain at least one generation, wherein the genealogical data includes a root node;
   display the plurality of nodes in a left justification configuration, wherein the plurality of nodes are positioned with respect to the relationships of the directed graph;
   move the plurality of nodes along the horizontal axis such that each node is in an equal spacing with respect to each node's parent node;
   determine a number of generations in the genealogical chart;
   generate a number of quadratic curves equal to the number of generations, wherein the apex of the quadratic curves is the position of the tree's trunk;
   drop the plurality of nodes in the Y-axis along the curve of the quadratic curves, wherein each generation is configured to be in line with the respective quadratic curve; and
   drop down the root node at the apex of the quadratic curves to form the trunk of the tree.

12. A non-transitory computer readable storage medium as in claim 11, wherein the computer-readable program further includes instructions for operation the computers system to center each of the plurality of nodes of one generation with each of the plurality of nodes of a subsequent generation.

13. A non-transitory computer readable storage medium as in claim 11, wherein the quadratic curve comprises a second degree or higher curve.

14. A non-transitory computer readable storage medium as in claim 11, wherein the quadratic curve comprises one or more of the following: a Bazier curve, an inverted parabola, and a sine curve.

15. A non-transitory computer readable storage medium as in claim 14, wherein the vertex of the inverted parabola comprises the trunk position.

16. A non-transitory computer readable storage medium as in claim 11, wherein the computer-readable program further includes instructions for operation the computers system to provide a user interface configured to provide a user with controls to manipulate the genealogical tree.

17. A non-transitory computer readable storage medium as in claim 16, wherein the computer-readable program further includes instructions for operation the computers system to provide user interface components for selecting an image of a tree to display as a background of the genealogical chart.

18. A non-transitory computer readable storage medium as in claim 16, wherein the computer-readable program further includes instructions for operation the computers system to provide user interface components for changing font and data of the display of the genealogical tree.

19. A non-transitory computer readable storage medium as in claim 11, wherein the number of generations determines the amplitude of the quadratic curve.

20. A non-transitory computer readable storage medium as in claim 19, wherein a selected horizontal spacing of each of the nodes determines the period of the quadratic curve.

* * * * *